United States Patent Office 3,316,203
Patented Apr. 25, 1967

3,316,203
SOLVENT RESISTANT PAVING COMPOSITION CONTAINING A SYNTHETIC HYDROCARBON RESIN AND AN ETHYLENE-ALKYL ACRYLATE COPOLYMER
John E. Dereich, Pittsburgh, and James R. Patterson, Carnegie, Pa., assignors to Neville Chemical Company, Pittsburgh, Pa., a corporation of Pennsylvania
No Drawing. Filed May 2, 1963, Ser. No. 277,462
14 Claims. (Cl. 260—33.6)

This invention relates to a new type of solvent resistant binder and to its use in paving compositions. More particularly it relates to novel thermoplastic binder compositions suitable for mixing with mineral aggregate for use in building roads or pavements having a light reflective or colored surface characterized by high resistance to gasoline, jet fuel and similar solvents. Still more particularly it relates to compositions of the aforementioned type which contain a thermoplastic solid hydrocarbon resin or a hydrocarbon resin plus a plasticizing oil as the principal binder component and a copolymer of ethylene and an alkyl acrylate as a minor component, preferably with the further addition of a small amount of an elastomer such as styrene-butadiene synthetic rubber or natural rubber.

Heretofore pavements for roads and the like have been based principally either on mineral aggregate employing black petroleum asphalt as binder or on concrete mixes comprising Portland cement. The asphalt pavements are generally cheaper and more convenient to install and more resilient than concrete. However, ordinary asphalt pavements also have the disadvantage of being substantially soluble in liquid hydrocarbons such as gasoline as well as having poor light reflectance, thereby impairing visibility especially for night driving. It has been previously proposed that one or more of these disadvantages could be overcome by using various resinous formulations as partial or total replacements for the conventional black asphalt binder. Thus, pavements based on epoxy resins have achieved some success where their high cost could be justified because of their good resistance to solvents and heat, e.g., for runways for jet aircraft. Pavements based on relatively expensive polyolefin resins such as polystyrene, polyethylene or polypropylene have also been proposed. However, there remains a need for relatively inexpensive pavement compositions that are easy to install, light in color and hence capable of being pigmented, and have good solvent resistance as well as other desirable characteristics.

It is an object of this invention to provide binders for pavements that are based on relatively inexpensive hydrocarbon resins but are nevertheless resistant to the action of solvents such as gasoline, jet fuel and lubricating oil.

Another object is to provide binders and paving compositions which are inherently light in color and can be pigmented to produce a wide variety of colors.

Another object is to provide pavements which remain relatively cool on exposure to the sun and hence possess increased stability in hot weather.

Another object is to provide paving compositions of suitable physical properties such as flexibility, ductility, and oil resistance such that they can be used for providing a solvent resistant surface by application of a thin layer thereof over an ordinary black asphaltic pavement or over a Portland cement concrete pavement.

These and other objects as well as the nature, mode of operation, and scope of invention will become more clearly apparent from the subsequent description.

It has now been discovered that an unusually effective binder for pavement can be formulated by combining certain relatively inexpensive hydrocarbon resins with a small amount of a resinous ethylene-alkyl acrylate copolymer, with or without the further inclusion therein of a small amount of a rubbery polymer such as SBR rubber or natural rubber.

The novel binder is particularly suitable for use as an asphaltic cement for the preparation of "hot mix asphaltic concrete." In such use, the binder is desirably preheated to about 275–310° F. to convert it into a liquid of suitable low viscosity and is then pumped into a pugmill loaded with preheated mineral aggregate, e.g., aggregate that has been preheated to about 350° F. in a conventional manner. The binder and aggregate are then mixed and spread using an aggregate spreader or an asphalt paver, and rolled with a roller in the same manner as an ordinary black petroleum asphalt paving composition.

Alternately, the novel binder may be used for any of the following types of asphalt: asphalt cement, rapid curing liquid asphalts, medium curing liquid asphalts, slow curing liquid asphalts and aqueous asphalt emulsions.

An asphalt cement is asphalt that is refined to meet specifications for paving purposes. Asphalt cements have penetration values between 40 and 300 (ASTM D-5) and are 99.5% or more soluble in carbon tetrachloride. Asphalt cement and the proper aggregate are mixed at about 300° F. to make asphaltic concrete (often referred to as "hot mix"). This asphaltic concrete is spread to the proper thickness and rolled to make asphalt pavements.

The rapid curing liquid asphalt is an asphalt cement which has been blended with a petroleum naphtha or gasoline of high volatility which evaporates rapidly after application of the asphalt. The composition of such asphalts is usually between about 50–80% binder and 50–20% solvent. The medium curing liquid asphalt is an asphalt cement which has been blended with a kerosene type diluent of medium volatility. Again, about 50–80% binder and 50–20% of diluent can be used. A slow curing liquid asphalt is an asphalt cement which has been blended with a mineral oil having relatively low volatility, e.g., a gas oil boiling predominantly above about 250° C. The asphalt cement content is usually 40 to 80%.

Emulsified asphalts are emulsions of asphalt cement and water which contain a small amount of a conventional emulsifying agent. In such an emulsion the water usually forms the continuous phase of the emulsion and the minute globules of asphalt form the discontinuous phase. Inverted emulsions are also used. Asphalt emulsions may be either anionic or cationic. The asphalt cement content is usually about 55 to 70%.

These various modifications of asphalt cement are used for asphalt seal coats, asphalt fog treatment, asphalt prime coats, asphalt tack coat and penetration macadam. With the same modifications our binder can be used for any of these applications.

Various grades of asphalt cement are used for making hot melt asphalt concrete. The four grades adopted by the Asphalt Institute, viz. 60–70, 85–100, 120–150 and 200–300 as well as 40–50 which is used for special applications or for road paving in hot climates can all be produced by using suitable embodiments of the present invention. A variation of approximately 20° C. in the softening point of the binder employed in the invention may be sufficient to cover the above difference in penetration of from 40–50 up to 200–300 range. Thus it can readily be seen that the required cement grade can be obtained by a slight modification of any ingredient employed in the present invention such as would change the binder softening point, as for example by suitable choice of the resin type, or by a particular soft point level of the hydrocarbon resin chosen, or by proper choice of the amounts of hydrocarbon resin and plasticizer oil to be used, or further by variation in the degree of steaming employed in the preparation of the binder. In short, the equivalent of the above five grades of asphalt cement can be made by the present invention by selection of any of the foregoing means or others affecting the binder softening point.

The aggregates used in making paving compositions in accordance with this invention are mineral aggregates of conventional compositions. When a thick, heavy duty pavement is to be laid down, e.g., a layer about 1 inch to 5 inches thick, a suitable aggregate may comprise a mixture of, for instance, 100 parts of coarse aggregate such as crushed rock or gravel, 80 parts of fine aggregate or sand and about 5 parts of mineral dust, all according to well known criteria used to formulate mixtures that meet specified gradation requirements. On the other hand, when, for instance, the paving composition is to be used only as a thin overlay for resurfacing a deteriorated old pavement or to provide a surface of desired color on top of a proper bed or paved underlayer, the binder may be mixed with sand only. The ratio of mineral aggregate may be varied over a wide range according to well known principles depending on particle size distribution of the aggregate, viscosity and melting point of the binder, end use to which the pavement is to be put, etc. Typically about 5 to 15 parts, and preferably about 5 to 9 parts of binder per 100 parts of aggregate may be used.

The coarse aggregate may be crushed limestone, crushed gravel, quartz, water quenched slag, or sea shells. All aggregate retained on No. 8 sieve (ASTM C-136) is considered coarse aggregate. However, the coarse aggregate used generally ranges from ⅛ inch to ½ inch. The fine aggregates may similarly be crushed limestone, crushed gravel, quartz, crushed sea shells, crushed sandstone, or sand ranging in size from that retained on No. 200 sieve and including all material passing the No. 8 sieve. Generally the fine aggregate used ranges from about .004 inch to ⅛ of an inch. The mineral filler may be pulverized limestone, silica, hydrated lime, pulverized slag, or Portland cement. By official particle size definition at least 65% of the mineral filler should pass the No. 200 sieve. When a pigment is used in the paving composition it should be considered as part of the mineral filler.

The two essential components of the binder compositions formulated according to the present invention are, first, a hydrocarbon resin base of relatively light color and suitable softening point and, second, a resinous copolymer of ethylene and an alkyl acrylate, preferably a copolymer of ethylene and ethyl acrylate. In addition, it is useful to include in the novel compositions a small amount of a rubbery hydrocarbon polymer although this is optional.

The hydrocarbon resin base in turn may be a resin of low softening point obtained directly by suitable polymerization of an appropriate hydrocarbon feedstock, or, preferably, it may be a mixture composed of one or more hydrocarbon resins of relatively high softening point and an appropriate amount of a hydrocarbon plasticizer oil.

To the hydrocarbon resin base may be added small amounts of polyethylene of various grades in combination with the ethylene-alkyl acrylate copolymer to produce binder with the desired specifications set forth below. Polyethylene, however, cannot be used alone with the hydrocarbon resin base, because polyethylene amounts large enough to give good resistance to the action of gasoline will give a binder with inadequate ductility.

The following three principal types of resins, referred to herein as types I, II and III, respectively, are representative of resins particularly suitable for use in the present invention.

Type I are the LPD (low pressure distillate) type resins prepared by Friedel-Crafts polymerization of an unsaturated normally liquid hydrocarbon fraction boiling between 100–275° C. obtained from high temperature and low pressure pyrolysis of normally liquid or gaseous hydrocarbons having two or more carbon atoms per molecule. The cracking operation may be carried out with or without steam being present. These fractions may be by-products of pyrolytic processes in which the principal products sought are low boiling olefins and dienes such as ethylene, propylene, butenes, butadiene, etc. which are widely used base hydrocarbons in the petrochemical and plastics fields including elastomers. Pyrolysis of both liquid and gaseous hydrocarbons for such purposes is well known and need not be described in detail. Suitable Friedel-Crafts catalysts are boron trifluoride, aluminum chloride, or aluminum bromide followed by neutralization of or removal of the spent catalyst followed by suitable vacuum or steam distillation to separate the resin from the unreacted components of the feedstock. Cyclodienes may be included in or removed from the polymerizable feedstock prior to polymerization.

Type II resins are resins of the dicyclopentadiene type, i.e., resins prepared by thermal polymerization of dripolene streams obtained as a well known product of the thermal cracking of natural gas or low boiling liquid petroleum fractions. These polymerization feeds obtained from the cracking of petroleum gas or liquid stocks contain mono-, bi-, and poly-cyclic olefins and diolefins from $C_5$ to $C_{14}$ distilling between about 50° C. and 340° C. and have a specific gravity of 15.6/15.6 of between .900 to .980. Present in such feeds as principal component amounts of more than 10%, preferably more than 30%, are dicyclopentadiene and one or more of the following: indene, methyl styrene and styrene; present in intermediate amounts of between 3 and 10% are one or more of the following: dimer or methylcyclopentadiene, mixed dimer of cyclopentadiene and methylcyclopentadiene, methyl indene, vinyl methyldicycloheptene, dimethylcyclohexadiene, methylcyclohexadiene, and cyclohexadiene. Usually present in small amounts are methyl bicycloheptadiene, methyl bicycloheptene, bicycloheptadiene, bicycloheptene, dimethylcyclopentadiene, methylcyclopentadiene, cyclopentadiene, isoprene and piperylene, or any of them. The other components may be benzene, toluene, xylene, and higher aromatics containing up to 14 carbon atoms or any of them. The percent resin recoverable from such feeds usually ranges from 30 to 90% by weight. Particularly desirable feeds contain at least 50% of dicyclopentadiene and its homologues. Such feeds are thermally polymerized usually at temperatures ranging from 200° C. to 300° C. at pressures ranging from atmospheric to 500 p.s.i. and reaction times ranging from ½ hour to 48 hours to get a hydrocarbon resin of the type II shown in Table I below. Particularly preferred are resins having a ring-and-ball softening point in the range of about 180–220° C. and a Neville color of 4 or less.

Type III are coumarone-indene resins prepared by the catalytic polymerization of the crude heavy solvent fraction obtained as a by-product in the coking of coal. Coumarone indene resins are also made from selected distillate fractions which are essentially hydrocarbon in character resulting from the pyrolysis of coal, petroleum, or other oils. The so-called crude heavy naphtha solvent fractions boiling from 160–210° C., or more specifically from 170–185° C., obtained from distillates prepared from tars, etc. resulting from the coking of coal or manufacture of synthetic heating gases such as carbureted water gas are especially suitable feedstocks for this purpose. They contain polymerizable materials including indene, methyl indene, noumarone, styrene, methyl styrene, dicyclopentadiene, etc. Distillate fractions of petroleum cracked under severe conditions may contain similar hydrocarbons. The coumarone-indene resins are prepared by acid or Friedel-Crafts polymerization of the above crude streams followed by suitable neutralization or removal of spent catalyst and vacuum or steam distillation to separate the low molecular weight materials from the finished polymer.

Another hydrocarbon resin type of possible utility herein includes the light colored thermoplastic steam-cracked petroleum resins melting between about 0–220° C., with molecular weights between about 250 and 5000, and specific gravities at 25/25° C. between about 0.95 and 0.98, prepared as described, for instance, in U.S. Patents 2,734,046 and 2,770,613. When blended with proper proportions of plasticizer oil and ethylene-alkyl acrylate copolymer, they can likewise be used to produce binder meeting the desired specifications set forth below.

Oily plasticizers suitable for use in this invention include those petroleum hydrocarbon oils which boil essentially above 400° C. with an initial boiling point of 300° C. or higher and have a straight aniline point below 90° C., preferably below 60° C. Oil with high aniline points produce binders that skin undesirably when subjected to high temperature in the presence of air. This skinning seems to reduce the bonding ability of the binder.

Table I below shows examples of the various types of resin which may be used in the present invention, as well as some of their characteristic properties.

Color, Meter methods both of which use the color standards of the Barrett Color Method as described in "Tar Acid Testing Method" published by the Barrett Division, Allied Chemical and Dye Company, New York, 1946. In "Neville Color, Visual" a direct eye comparison of resin solution with the standards is made. In "Neville Color, Meter" an electrometric adaptation employing percent light transmission is used and calibrated for conversion to nearest 0.1 of the standard colors.

Examples of plasticizer oils suitable for use herein are shown in Table II.

TABLE II

|  | Plasticizer Oil No. 1 (Humble Flexon 391) | Plasticizer Oil No. 2 (Humble Nuso 250) | Plasticizer Oil No. 3 (Atlantic 231 Oil) | Plasticizer Oil No. 4 (Sohio Refined STJ-19) |
|---|---|---|---|---|
| Sp. Gr. at 15.6/15.6° C. | .971 | .981 | .991 | .989 |
| Distillation: |  |  |  |  |
| IBP, ° C. | 300 | >400 | >400 | 390 |
| 5%, ° C. | 378 |  |  |  |
| 10%, ° C. | 389 |  |  |  |
| 20%, ° C. | 398 |  |  |  |
| 30%, ° C. | 400 |  |  |  |
| Aniline Pt., ° C. | 45 | 51 | 57 | 13 |
| Color, Gardner | 12 | >18 | >18 | 11+ |
| Color, Neville | .2 | 11 | 8+ | 1+ |
| Flash Pt., ° F. | 430 | 470 | 585 |  |

For purposes of this invention, the resinous hydrocarbon base should have a ring and ball softening point in the range between about 40° and 70° C. It may be composed of about 18 to 100% of hydrocarbon resin having a number average molecular weight between about 250 and 5,000, a ring and ball softening point in the range between about 40° C. and 250° C., an iodine number (ASTM method D-555) between about 0 and 250 milligrams per gram, and a Neville Color no darker than 10 but preferably no darker than 4; and about 0 to 82% of a plasticizer hydrocarbon oil which is liquid at 25° C., preferably has a Gardner-Holdt viscosity $Z \rightarrow Z_{10}$ at 25° C., boils predominately above 400° C., is substantially free of material boiling below 300° C., and has an aniline point between about 10 and 90° C. and a Neville Color less than

TABLE I.—GRADES OF SUITABLE RESINS

| Type | Class | R. & B. Softening Pt., ° C. | Neville Color | Specific Gravity* | n 25/D | No. Average Mol. Weight | Iodine Number |
|---|---|---|---|---|---|---|---|
| IA | Hydrocarbon | 90-140 | 2-5 | 1.040-1.080 | 1.580-1.600 | 750-1,500 | 60-90 |
| IB | do | 42-90 | 2-5 | 1.030-1.070 | 1.570-1.600 | 500-950 | 60-90 |
| IC | do | 0-42 | 2-5 | 1.010-1.050 | 1.560-1.600 | 350-600 | 60-90 |
| IIA | do | 98-155 | 1-8 | 1.060-1.125 | 1.570-1.620 | 650-1,500 | 125-175 |
| IIB | do | 95-140 | 0.3-1.5 | 1.060-1.125 | 1.550-1.600 | 650-1,500 | 150-200 |
| IIC | do | 150-220 | 0.3-4.0 | 1.060-1.130 | 1.550-1.620 | 1,000-5,000 | 150-200 |
| IIIA | Coumarone-Indene | 135-200 | 0.1-2.5 | 1.125-1.150 | 1.590-1.640 | 900-2,500 | 5-30 |
| IIIB | do | 122-135 | 0.1-2.5 | 1.125-1.150 | 1.620-1.640 | 650-1,100 | 5-40 |
| IIIC | do | 85-122 | 0.1-2.5 | 1.125-1.150 | 1.615-1.635 | 550-1,000 | 5-50 |
| IIID | do | 0-85 | 0.1-2.5 | 1.090-1.130 | 1.620-1.640 | 250-750 | 5-50 |

*At 25/25° C.

The following test methods were used in establishing the values in Table I:

(1) R. & B. softening point—ASTM E-28-58T, appearing in 1958 ASTM Standards, part 8, pp. 1520-1527, with the exception that stirring is not used.
(2) Specific gravity—ASTM D-71-52, appearing in 1958 ASTM Standards, part 4, pp. 1047-1048.
(3) n25/D—Neville method extrapolates to solid resin basis from suitable solution.
(4) No. average mol. weight—Menzies and Wright Method; J. Am. Chem. Soc., 43 July–Dec. 1921, p. 2311.
(5) Iodine number—ASTM D-555 for all but the coumarone-indene values which used ASTM D-1158.

Throughout this specification colors have been determined by either the Neville Color, Visual or the Neville 10 and preferably less than 4. The optimum amount of oil depends on the characteristics of the hydrocarbon resin used and the characteristics of the plasticizing oil, the oil being added thereto in whatever quantity is needed to produce a binder composition of suitable properties. For instance, when a relatively soft resin having a softening point below about 70° C. is used, such as a type IC resin shown in Table I, no plasticizer oil is required. Conversely, with a hard, high melting resin of type IIC or IIIA as much as five or more parts of oil may be used per part of resin. Compositions containing about 20 to 75 percent of a relatively high melting resin and correspondingly about 80 to 25 percent of a suitable plasticizer oil are preferred. It is preferred to employ a resin having a ring and ball softening point of at least 150° C. and then reduce the softening point of the hydrocarbon base composition to the desired level by including therein an appropriate amount of a suitable plasticizer oil.

In addition to the hydrocarbon base components described above, it is essential that the binder also contain a minor proportion, about 3 to 15, preferably 5 to 10, percent based on the weight of the hydrocarbon components, of a resinous copolymer of ethylene and alkyl acrylate. While ethyl acrylate is preferred as the acrylate component of the copolymer, any other alkyl acrylate containing from 1 to about 12 carbon atoms in the alkyl radical may be used. Examples of such other acrylate are methyl acrylate, pentyl acrylate, 2-ethyl-hexyl acrylate, lauryl acrylate and similar compounds. Suitable copolymers, which may contain about 1 to 5 mole percent of the acrylate combined therein, are prepared from feed stocks containing about 0.2 to 1.5 moles, preferably from 0.4 to 1 mole of the acrylate per 100 moles of ethylene. These copolymers are well known per se and are generally prepared by copolymerization of the monomers in the presence of oxygen or a peroxidic compound at pressures ranging from about 20,000 p.s.i. upwards and at temperatures between about 100° C. and 350° C. Suitable methods for their preparation are described, for instance, in U.S. Patents 2,953,541 and 2,953,551. Suitable copolymers are presently being marketed under the trade names DPD-6169 and Zetafin.

The ethylene/acrylate copolymer useful in the novel paving compositions are soluble in the plasticising oil when hot. However, upon cooling from 400° F. to room temperature the solution forms a stiff gel with the gel hardness increasing as the copolymer content is increased. Using a ratio of 3% copolymer to 97% oil a gel is formed at about 275-300° F. and as the temperature reaches a 100° F. the gel is very rigid. Using 5% copolymer and 95% oil gives results at approximately the same sequence with a harder gel. The gel is resistant to gasoline under testing conditions. The straight oil is not. The copolymer may be hot blended with the resin, or dissolved in the hot oil and then added to the hot resin, or added during the steaming process used to remove the rubber solvent and light ends of the final paving composition.

As an optional feature, a natural or synthetic rubber in the raw, unvulcanized state may desirably be included in the pavement binder. Suitable hydrocarbon rubbers include SBR, natural rubber, butyl rubber, polyisoprene rubber, polybutadiene rubber, polyisobutylene rubber. Oil resistant rubbers containing non-hydrocarbon components, such as polychloroprene rubber, nitrile rubber (ABR), thiokol or organic polysulfide rubber, in the raw unvulcanized state, as well as light colored reclaimed rubber may also be used. The rubber may be included in the mixture in concentrations up to about 10%, preferably 1 to 6%. The rubber is beneficial in improving the temperature susceptibility and fluidity factor of the binder with the result that the rubber-containing binders are particularly outstanding with respect to resistance to softening in hot weather. In addition, the rubber also reduces the low temperature brittleness of the binder, improves its adhesion, resistance to weathering and hydrocarbon solvents, and also improves the coefficient of friction between the paved surface and rubber tires riding over it such that the reduced amount of friction between the paved surface and the tires yields improved wearing qualities for the tires.

The binder composition of this invention may be made by conventional blending techniques. For instance, the hydrocarbon resin (which may be a solid or a viscous liquid at room temperature), the plasticizer oil, if needed, and ethylene-alkyl acrylate copolymer are mixed together and heated at a temperature of about 200 to 250° C. for a period of about 15 minutes to one hour or until complete solution, which depends on the type of mixer, the speed of mixing, etc. If it is desired to include a rubbery polymer in the binder, the rubber may be added to the other ingredients in a suitable solvent such as naphtha or xylene and the mixture then steam distilled until the volatile components are removed. Where such a steam distillation is employed a plasticizer oil which contains volatile components may be used as these components will be removed to the desired extent in the steam distillation step, wherein a pot temperature of about 250° C., regular or superheated steam, and atmospheric pressure or vacuum are used if necessary. Alternately, a plasticizer may be used from which the undesirable low boiling ends were previously removed. Also, instead of adding the rubbery polymer in a low boiling solvent which later must be stripped out, it is possible to add the rubbery polymer in the form of a solution in the plasticizer oil. Furthermore, the rubbery polymer may be added in the form of an aqueous latex, in which case the water present is driven off during preparation of the binder blend, or it can be added as a granulated solid.

Desirably the binder for pavements of this invention, which comprises a blend of the hydrocarbon resin base and the ethylene-alkyl acrylate copolymer, and optionally also an elastomer, should have the properties shown in Table III.

TABLE III.—BINDER SPECIFICATIONS

| Name of Test | Broad | Preferred |
|---|---|---|
| 1. Gasoline Solubility Rating, Percent | 0-60 | 0-50 |
| 2. Ring-and-Ball Softening Point, ° C | 45-90 | 60-80 |
| 3. Penetration, ASTM D-5 (100 gms., 5 secs.) at 77° F | 30-300 | 40-100 |
| 4. Ductility (ASTM D-113), cm | 45+ | 100+ |
| 5. Saybolt-Furol Viscosity at 275° F., secs | 100-1,000 | 200-500 |
| 6. Flash Point, COC, ° F | >400 | >450 |
| 7. Loss on heating at 325° F. for 5 hrs., ASTM D-6, percent | 0-2 | 0-1 |
| 8. Penetration of Residue after loss on heating test, as percent of original ASTM D-5 | 70-100 | 85-100 |

In formulating the above binders it is usually preferred to use a resinous hydrocarbon base comprising a resin with a ring-and-ball softening point of at least 150° C. and then reducing the softening point of the resinous hydrocarbon base to the desired level by including therein an appropriate amount of a suitable plasticizer oil. It should be noted that the addition of the ethylene alkyl acrylate copolymer and also the addition of the rubber to the resinous hydrocarbon base produces a binder with stiffer, sturdier characteristics and higher viscosity than that of the resinous hydrocarbon base alone.

When it is desired to use the present invention for making colored pavements, for instance, for paving driveways or service areas in gasoline stations, or for color coding of complex highway interchanges by means of appropriately colored dividing strips, any light, heat and weather stable pigment or combination of pigments may be used. Thus, suitable pigments include titanium dioxide, phthalocyanine green, phthalocyanine blue, iron oxide red, molybdate orange, toluidine red, chrome yellow, etc. Where merely a paving surface of good light reflecting properties is desired, satisfactory results can be obtained by combining the binder with a suitable light colored stone aggregate, without the addition of any pigment or with the addition of a white pigment such as titanium dioxide.

*Gasoline solubility tests*

To determine the solubility of the binder in gasoline, the following method was devised.

A ½" x ½" x ½" cube of binder is prepared by first amalgamating the contacting surfaces of a cube mold (as specified in ASTM C-61-38, softening point of tar products) and then pouring enough molten binder into the mold to form a cube. The cube is cooled to below room temperature to aid in the removal from the mold. The cube is removed and placed in a tarred Erlenmeyer flask and weighed. 50.0 ml. of non-leaded gasoline at 77° F. is added and the flask agitated for exactly five minutes by being placed in a mechanical sieve shaker which rotates the flask in a circular motion at the rate of 300 revolutions per minute. The gasoline used is a commercial, non-leaded, high-test gasoline containing about 36.1% paraffins plus naphthenes, 23.6% monoolefins, and 40.3% aromatics (including a small amount of diolefins), the percentages being by volume, and possessing a specific gravity at 15.6° C. of 0.765, a mixed aniline point of 43.8° C., and a distillation curve (ASTM D–86) characterized by the following points: I.B.P., 35° C.; 10% at 59° C., 50% at 118° C., 90% at 167° C., and an end point of 192° C.

Non-leaded gasoline was used here because of the decreased toxicity factor, but of course, the resistance of the material to solution in leaded gasoline would be expected to be at least equal to or greater than the results given here because of the fact that leaded gasolines may be less aromatic and consequently less potent solvents for the material under test.

The gasoline is decanted from the cube at the end of the five minutes of agitation. A tube is then placed in the flask and connected to a compressed air line and air is passed into the flask for five minutes to remove the remainder of the gasoline. The flask and the remaining binder are weighed and the loss in binder weight calculated. Table III–A below shows the average results of duplicate tests made on a conventional black petroleum asphalt binder and on each of several resin binders representative of the prior art and of the present invention, respectively.

Binder I was composed of 27 parts of type IIC resin (Table I) (S.P. 185° C.); 63 parts of plasticizer oil No. 1 (Table II); 3 parts of SBR rubber.

Binder II was identical with binder I except that it additionally contained 7 parts of thermoplastic resinous copolymer of about 99% ethylene and about 1% ethyl acrylate (DPDB–6169), added in the form of 1/8" pellets, having a melt index (ASTM D–1238–52T) of 6 gm./ 10 min., a density (ASTM D–1505–57T) of 0.931 gm./cc. and a durometer hardness (Shore A) of 86.

Binder III was composed of 26 parts of type IIC resin (S.P. 185° C.); 61 parts of plasticizer oil No. 1 from which light ends boiling below 300° C. were previously removed; 3 parts of SBR rubber; 10 parts of ethylene-ethyl acrylate copolymer (same as in binder II).

Binder I was prepared by blending with agitation at 25° C. 33 parts of a polymerized oil (which previous distillation showed to contain about 82% resin of type IIC, 185° C. soft point), 63 parts of plasticizer oil No. 1, and 30 parts of a 10% by weight solution of SBR rubber in naphtha, and steam distilling at 250° C. until a spot check of the distillate coming over indicated that the oil content of the total distillate (oil+water) was less than 5% by volume.

Binder II was prepared in the same way as binder I except that 7 parts of the ethylene-ethyl acrylate in pellet form was included in the blend.

Binder III was prepared similarly, except that the plasticizer oil was topped in advance to remove the low boiling components therefrom, and was used instead of naphtha as the solvent medium for the SBR rubber. Consequently, it was not necessary to finish this blend by steam stripping.

When subjected to the gasoline solubility test described above, except that relatively gentle manual shaking was used instead of the mechanical shaker, the various binders tested gave the results summarized in Table III–A. All gasoline solubility values are the average of two determinations.

TABLE III–A.—SOLUBILITY OF BINDERS

| Binder: | Percent dissolved |
|---|---|
| 60–70 pen. asphalt | 76 |
| Commercial resinous binder, "W" | 80 |
| Binder I (w/o E–EA copolymer) | 70 |
| Binder II (invention) | 9 |
| Binder III (invention) | 8 |

It will be noted that binders II and III are far superior to both asphalt and the commercially available resinous binder and to binder I which contained the same hydrocarbon resin base as binder II but did not contain the acrylate copolymer.

The effect of gasoline on finished pavements was determined by the following tests:

250 grams of an aggregate conforming to Pennsylvania Specifications for FJ–1 bituminous surface* and 17.5 grams of binder is heated separately in beakers in an oven to 325° C., the binder is poured onto the aggregate, and the mixture is mixed thoroughly with a spatula and then placed in a stainless steel circular mold 3⅜" diameter and pressed with a piston at 1000 pounds per square inch pressure.

The plug is allowed to cool. 10 ml. of non-leaded gasoline (same as described above) are allowed to drip slowly from a burette onto the face of the plug, the plug being held in a horizontal position two inches from the tip of the burette. The burette should be adjusted so that seven minutes are required for the 10 ml. of gasoline to drip onto the plug. The plug is then set aside for 16 hours. It is then placed under a hard stream of running water and the erosive action of the water is noted. The plug is kept under the water until all loose aggregate has washed away.

The effect of the gasoline on two plugs is shown below:

| Binder | Wt. Change, gms. | Apparent Change |
|---|---|---|
| 60–70 Penetration Asphalt | –45.1 | Hole washed through plug. |
| Binder II | +0.1 | No change observed. |

Heat reflectance tests

Two circular plugs four-inches in diameter and one-inch thick were made using blast furnace slag aggregate. One plug used commercial asphalt for the binder, the other used binder II as above containing 4 parts per 100 of TiO$_2$. The bulb of a thermometer was imbedded in each of the plugs ½" below the surface in the center of the plug. The plugs were placed on a wooden board and placed outdoors in the sun in such a position that the rays of the sun hit the plugs at right angles to the surfaces.

The temperatures of the plugs and the air temperature (shade) were recorded as follows:

| Time | Outside Air Temp. (in the shade), °F. | Pigmented Plug, Binder II, °F. | Asphalt Plug, °F. | Difference, °F. |
|---|---|---|---|---|
| 10:00 a.m.—Plugs placed in sun: | | | | |
| 11:00 a.m | 88 | 115 | 124 | 9 |
| 11:45 a.m | 89 | 120 | 129 | 9 |
| 1:00 p.m | 90 | 122 | 129 | 7 |

---

* Page 51, Bulletin 27 "Specifications for Plant Mixed Bituminous Surface Coarse Material"—Commonwealth of Pennsylvania, Dept. of Highways (1954 revised).

The pigmented plug was from 7° to 9° F. cooler than the asphalt plug. Since heat is known to be one of the environmental factors which contribute to the degradation and eventual failure of asphalt paving, the lower temperature of the pigmented surface is indicative of an important advantage in favor of the present invention.

*Light reflectance tests*

Three plugs similar to those discussed above, one using black asphalt and one again using binder II, and one composed of Portland cement concrete, were placed perpendicular to the beam of an automobile headlight 10 feet from the source. A General Electric Model 8DW58 Y4 light meter was used to measure light reflected from the surface.

| | Reflected light, foot-candles |
|---|---|
| Asphalt plug | 2 |
| Concrete | 8 |
| $TiO_2$ pigmented resin plug (invention) | 10 |

The value of the novel composition in increasing night visibility at a given illumination, as well as allowing a reduction in the number of candle power required to provide a given amount of illumination on lighted streets and roadways, is clearly evident.

The same three plugs were then thoroughly wet with water. The surface film of water was removed with a cloth and the readings repeated.

| | Foot-candles |
|---|---|
| Wet asphalt | 2 |
| Wet concrete | 5 |
| Wet pigmented resin plug (invention) | 9 |

The data show that the pigmented plug embodying the present invention decreased only slightly in degree of reflectance. The concrete, however, showed a reduction of about 40% in amount of reflected light. Black asphalt, of course, reflected very little light whether dry or wet.

*Colored pavements*

A comparison of color obtainable with paving mixes using (1) binder III with $TiO_2$, (2) commercial asphalt with $TiO_2$, (3) binder III with phthalocyanine green, and (4) commercial asphalt with phthalocyanine green, is demonstrated by the four plugs shown in Table IV which were made using the proportions shown in Table IV.

TABLE IV

| | Plug 1 | Plug 2 | Plug 3 | Plug 4 |
|---|---|---|---|---|
| Type of Aggregate | Slag | Slag | Slag | Slag. |
| Type of Binder | Asphalt | Binder III | Asphalt | Binder III. |
| Type of Pigment | $TiO_2$ | $TiO_2$ | Phthalo Green | Phthalo Green. |
| Parts Aggregate | 100 | 100 | 100 | 100. |
| Parts Binder | 8 | 8 | 8 | 8. |
| Parts Pigment | 4 | 4 | 1 | 1. |
| Resulting Color of Plug | Dark Brown | Light Grey | Black | Green. |

The data show that a system using the novel binder can be readily pigmented by means of relatively small concentrations of conventional pigments whereas it is impossible to pigment asphalt.

The excellent resistance of the novel binder compositions to solvents such as gasoline, as well as their good balance of other required properties, can be seen from Table V by comparing the properties of blend Nos. 1–6 with those of blend Nos. 7–15. Blend No. 1 (asphalt) and the resinous binders designated as blend Nos. 2–6 are representative of the prior art while blend Nos. 7–15 are binders illustrative of the present invention.

The following materials were used in the proportions shown in Table V in making up the binder compositions having the properties reported in this table:

"Asphalt"—70–85 Penetration Asphalt Cement (S. No. 62, 864), Standard Oil Company (Indiana)
"Resin Type IIC"—see Resin Type IIC, Table I, above
"Oil No. 1"—see Plasticizer Oil No. 1, Table II, above
"SBR Rubber"—a rubbery copolymer of about 75% butadiene and about 25% styrene, in crumb form ("Ameripol 1006" Crumb Rubber, Goodrich-Gulf Chemicals, Inc.)
"E–VA Copolymer"—"Elvax 250" Ethylene-Vinyl Acetate Copolymer, E. I. du Pont de Nemours & company
"Polyethylene"—"Petrothene 202," U.S. Industrial Chemicals Co.
"Polystyrene"—"Polystyrene PS–330" Dow Chemical Co.
"E–EA Copolymer"—"DPDB 6169" Ethylene-Ethyl Acrylate Copolymer, Union Carbide Plastics Company The following abbreviations are used in Table V below to designate the corresponding specification properties:

(1) "Solubility"—Gasoline solubility rating, percent dissolved
(2) "Soft Pt."—R. & B. softening point, ° C.
(3) "Penetration"—Penetration @ 77° F., 100 gm., 5 sec. (ASTM D–5)
(4) "Ductility"—Ductility @ 77° F., cm. (ASTM D–113)
(5) "Vis. 275"—Saybolt-Furol viscosity @ 275° F., sec. (ASTM E–102)
(6) "Flash"—Flash point, C.O.C., ° F. (ASTM D–92)
(7) "Heat Loss"—Percent heat loss, 5 hours @ 325° F. (ASTM D–6)
(8) "Pen. Loss"—Penetration of residue after heat loss, percent of original (ASTM D–6)
(9) "Color, Visual"—Neville Color, Visual
(10) "Color, Meter"—Neville Color, Meter
(11) "Pen. Residue"—Penetration of residue after heat loss (ASTM D–6)
(12) "Vis. 325"—Saybolt-Furol viscosity @ 325° F., sec. (ASTM E–102)

The outstanding result to be noted is that the binders of the invention consistently show solubility ratings of less than 51, ratings of less than 35 and as low as 15 being achievable by including in the composition the required small amount of ethylene-acrylate copolymer along with the proper hydrocarbon base. At the same time, the blends of the invention have the required ductility as indicated by ductility values in the range between 45 and about 200; in fact, most of the novel binders have ductilities above 80, and a number of the novel binders have ductilities in the particularly preferred range of between about 100 and 200.

In contrast, among the binders of the prior art the required ductility is obtainable only in the cases of the highly soluble blends. Blend No. 5 shows that while the inclusion of polyethylene in the hydrocarbon resin base results in a greatly improved gasoline resistance, it also reduces the ductility of the blend below the minimum useful value. Moreover, whereas in the binders of the present invention there is a certain inverse relationship between ductility and solubility, so that an optimum balance between the two can be struck more or less at will, Blend No. 6 shows that no such relationship can be postulated generally with respect to binders representative of the prior art. More specifically, Blend No. 6 shows that the addition of polystyrene to the hydrocarbon base does not significantly improve solvent resistance and yet it results in an extremely drastic decrease in ductility. Ductility values of less than 45 signify such poor cohesive and adhesive performance of the binder that the latter becomes unusable for combination with mineral aggregate to provide a well wearing pavement.

The best gasoline resistance was obtained in blend No. 8 (10% E–EA and 5% SBR) but keeping the E–EA copolymer content of the binder at 10% while reducing

TABLE V.—PAVEMENT BINDER COMPOSITIONS

| Blend No | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Composition (Wt. Percent): | | | | | | | | | | | | | | | |
| Resin IIC | (¹) | 33.3 | 30.0 | 31.0 | 26.5 | 28.0 | 28.0 | 21.0 | 23.0 | 24.5 | 26.2 | 26.0 | 27.5 | 31.5 | 28.0 |
| Oil No. 1 | | ²66.7 | 65.0 | ²64.0 | ²68.5 | ²67.0 | ²67.0 | 74.0 | 64.0 | 64.0 | 62.1 | 67.0 | 64.0 | 59.3 | 64.0 |
| SBR Rubber | | | 5.0 | | | | | 5.0 | 3.0 | 1.5 | 4.9 | 3.0 | 1.5 | 4.6 | 3.0 |
| E–VA Copolymer | | | | 5.0 | | | | | | | | | | | |
| Polyethylene | | | | | 5.0 | | | | | | | | | | |
| Polystyrene | | | | | | 5.0 | | | | | | | | | |
| E–EA Copolymer | | | | | | | 5.0 | 10.0 | 10.0 | 10.0 | 6.8 | 7.0 | 7.0 | 4.6 | 5.0 |
| Specification Properties: | | | | | | | | | | | | | | | |
| 1. Solubility | 86 | 97 | 86 | 88 | 53 | 96 | 46 | 16 | 22 | 32 | 38 | 40 | 49 | 45 | 50 |
| 2. Soft. Pt | 52.0 | 44.0 | 46.5 | 45.0 | 83.0 | 49.0 | 72.0 | 79.0 | 78.0 | 78.0 | 76.0 | 76.5 | 76.0 | 60.5 | 72.0 |
| 3. Penetration | 73 | 70 | 86 | 73 | 86 | 94 | 83 | 83 | 74 | 67 | 88 | 87 | 74 | 70 | 95 |
| 4. Ductility | 138+ | 138+ | 138+ | 138+ | 39 | 16 | 84 | 46 | 49 | 65 | 99 | 91 | 138+ | 138+ | 138+ |
| 5. Vis. 275 | 296.8 | 53.4 | 132.0 | 166.0 | 117.5 | 79.2 | 169.2 | 732 | 740 | 801 | 517 | 434 | 473 | 323 | 262 |
| 6. Flash | 655.0 | 455.0 | 480.0 | 455.0 | 465.0 | 450.0 | 455.0 | 435 | 455 | 440 | 435 | 435 | 440 | 445 | 450 |
| 7. Heat Loss | 0.03 | 0.83 | 0.36 | 0.61 | 0.67 | 0.47 | 0.41 | 0.68 | 0.64 | 0.53 | 0.90 | 0.64 | 0.56 | 0.76 | 0.62 |
| 8. Pen. Loss | 94.4 | 84.3 | 90.7 | 97.2 | 93.1 | 85.0 | 83.3 | 88.2 | 88.6 | 87.5 | 85.7 | 86.9 | 87.1 | 83.2 | 85.7 |
| 9. Color, Visual | 22 | 3 | 4+ | 3 | 3.5 | 3.5 | 3.5 | 2.5+ | 3.5 | 2.5+ | 2.5+ | 3+ | 2.5+ | 3+ | 3+ |
| 10. Color, Meter | | 2.9 | 3 | 2.6 | 2.8 | 3.1 | 2.8 | 2.3 | 3.1 | 2.2 | 2.4 | 2.7 | 2.3 | 2.8 | 2.8 |
| 11. Pen. Residue | 69 | 59 | 78 | 71 | 80 | 80 | 69 | 75 | 62 | 56 | 72 | 73 | 61 | 59 | 84 |
| 12. Vis. 325 | 81.8 | 27.0 | 36.0 | 62.0 | 47.4 | 56.0 | 61.2 | 305.0 | 259 | 249 | 182 | 144 | 144 | 112 | 88 |

¹ Asphalt.
² Stripped, 30% off.

Thus, it appears that the ethylene-alkyl acrylate copolymer, because of its limited yet adequate compatibility with the hydrocarbon resin base, produces an insoluble phase in the system which greatly reduces the solubility of the total system without undue effect on its ductility or cohesion. On the other hand, other olefin polymers or copolymers tend to have either only a very minor effect on solvent resistance (cf. blend Nos. 3 and 4), or they have a substantial effect on solvent resistance but drastically impair ductility (cf. blend No. 5). Still others, such as polystyrene, can have a catastrophic effect on ductility without resulting in any improvement in solvent resistance (cf. blend No. 6).

With regard to blend Nos. 8–11 it should be noted that their relatively high viscosity makes them particularly suitable for use in hot weather climates. Of course, because their viscosities at 275° F. are such that, in using them in the production of paving material, they are best mixed with aggregate at temperatures above the customary temperature of about 275° F., their viscosities at 325° F. show however that only a somewhat higher than normal mixing temperature is required. Mixing temperatures of up to 380° F. have been used satisfactorily with the binders of the present invention though lower temperatures are preferred. Naturally, heating conditions tending to cause localized overheating and consequent decomposition of the binder should be avoided. Good results can be obtained with materials having Saybolt-Furol viscosities at 325° F. between about 60 and 350, preferably between 60 and 260. If desired, stabilizers or antioxidants in effective amounts up to 5% may be added to the binder in the course of its preparation or processing into paving material to retard or minimize undesirable degradative changes. For instance, phenol or bisphenol type stabilizers such as di-tertiary butyl para cresol, 4,4′-methylene-bis-(2,6,-di tertiary butyl phenol) or any other suitable non-discoloring stabilizer or antioxidant may be used where light color is of importance. When discoloration can be tolerated amine type antioxidants such as phenyl-beta-naphthylamine or other compounds known for this purpose can be used likewise.

the SBR content to 1.5% still yields outstanding solvent resistance. Reducing the E–EA copolymer content in the binder progressively reduces solvent resistance, though as little as 3% E–EA still results in a major all-around improvement, especially when present in combination with 3 to 5 parts of a rubbery hydrocarbon. Blend Nos. 8, 9 and 10 are also interesting in showing that the beneficial effect of the rubber component on the viscosity index type behavior of the material; the viscosity decrease of the blend with temperature is in inverse relation to the amount of rubber present. The balance of properties desired in the blend, i.e., solvent resistance, viscosity, ductility, etc., can be adjusted by varying the kind and amount of base resin and plasticizer oil, acrylate copolymer as well as rubber. The combinations of solubility and ductility obtainable by means of the present invention perhaps best represent the uniqueness of the novel blends and of pavements made therefrom, as distinguished from resin binders based on polyethylene, other hydrocarbon polymers, or even copolymers of ethylene and vinyl acetate.

In summary, the present invention relates to new gasoline resistant paving compositions, and particularly to a new multi-component binder useful therein. This new binder is characterized by a gasoline solubility rating of not more than 60%, a ductility of more than 45, and a ring and ball softening point between about 45° and 90° C.; and contains (1) 100 parts of a light-colored resinous hydrocarbon base having a number average molecular weight between about 250 and about 5000, said base being substantially free of components boiling below 400° C., and a ring and ball softening point between about 35° and 70° C.; and (2) a compatible amount in the range of about 3 to 15 parts, preferably 5 to 10 parts, of a solid resinous copolymer prepared from a feed mixture containing about 98.5 to 99.8 mole percent ethylene and correspondingly about 1.5 to 0.2 mole percent of an alkyl acrylate containing from 1 to about 12 carbon atoms per alkyl group, said copolymer having a density of from about 0.915 to about 0.94 grams per cc. at 23° C. The said resinous hydrocarbon base either consists essentially of a hydrocarbon resin which by itself has the recited properties or it may consist essentially of about 18% or more of a relatively high molecular weight hydrocarbon resin, e.g., one having a softening point between about 90° and 220° C., or a mixture of such resins and correspondingly about 82% or less of a hydrocarbon plasticizer oil having a straight aniline point below 90° C. In addition, it has been found advantageous to incorporate in said binder composition about 1 to 10 parts of a rubbery polymer such as SBR rubber.

Though the ethylene-alkyl acrylate copolymer can be incorporated in the binder satisfactorily only in relatively low concentrations because of its limited compatibility, as little as 5% or less of the copolymer imparts a high degree of gasoline resistance to the resulting binder and to paving compositions made therefrom. Apparently the limited but effective compatibility of small amounts of the copolymer with the other components of the system results in the formation of an insoluble phase which reduces the solubility of the total system far out of proportion to the amount of copolymer present, without substantially impairing the cohesiveness of the finished blend.

As used in this specification, the terms "compatible" and "compatibility" refer to the ability of blending into the other materials without substantially impairing their cohesiveness or ductility, but not necessarily without producing some cloudiness indicative of some degree of heterogeneity.

Of course, it will be obvious to those skilled in the paving and construction art that the present invention may be used in a wide variety of ways other than on paving road surfaces, such as, for example in the construction of light or brightly colored curbing, traffic islands, medial strips, paving blocks for sidewalk pavement, and various shaped and sized pieces for mosaic tile, etc.

It will be understood that amounts and proportions of materials are expressed throughout this specification on a weight basis unless otherwise indicated.

The invention is particularly pointed out in the appended claims.

What is claimed is:

1. A gasoline resistant binder composition characterized by a gasoline solubility rating (using mechanical shaker) of not more than 60%, a ductility of more than 45, and a ring-and-ball softening point between about 45° and 90° C.; which composition consists essentially of
    (1) 100 parts of a hydrocarbon base consisting essentially of (a) about 18 to 100 percent of a hydrocarbon resin selected from the group consisting of coumarone-indene resins and petroleum resins derived by polymerization of cracked hydrocarbon streams and having a number average molecular weight between about 250 and 5,000, a ring-and-ball softening point in the range between about 0° and 250° C., an iodine number between about 0 to 250, and a Neville color not higher than 10, (b) 0 to 10 percent of a hydrocarbon rubber, and (c) 0 to about 82 percent of a hydrocarbon plasticizer oil which is substantially free of material boiling below 300° C.; and
    (2) a compatible amount in the range of from about 3 to 15 parts of a solid resinous copolymer composed of about 95 to 99 mole percent of combined ethylene and correspondingly about 5 to 1 mole percent of combined alkyl acrylate containing from 1 to 12 carbon atoms per alkyl group, said copolymer having a density of from about 0.915 to about 0.94 gram per cm.³ at 23° C.

2. A binder composition according to claim 1 in which the hydrocarbon base further contains about 1 to 6 percent of a rubbery hydrocarbon polymer.

3. A binder composition according to claim 1 wherein said resinous hydrocarbon base consists essentially of about 20 to 75 percent of a hydrocarbon resin having a softening point between about 90° and 220° C. and a specific gravity between about 1.01 and 1.30, and correspondingly about 80 to 25 percent of a hydrocarbon plasticizer oil having a straight aniline point below 90° C., and wherein said resinous copolymer is a copolymer of ethylene and ethyl acrylate.

4. A binder composition according to claim 3 wherein said hydrocarbon resin is a coumarone-indene resin.

5. A binder composition according to claim 3 having the following properties:

| | |
|---|---|
| Gasoline solubility rating, percent | 10–50 |
| Ring and ball softening point, ° C. | 60–80 |
| Penetration at 77° F. | 40–100 |
| Ductility (ASTM D–113) | 100+ |
| Saybolt-Furol viscosity at 275° F., secs. | 200–500 |
| Flash point, ° F. | 450 |
| Loss in heating at 325° F. for 5 hrs., percent | 0–1 |
| Penetration of residue after loss in heating test, percent of original | 85–100 |

6. A binder composition according to claim 3 wherein said hydrocarbon resin is a resin obtained by thermal polymerization of a dripolene stream and wherein said plasticizer oil has a straight aniline point below 60° C.

7. A binder composition according to claim 3 in which the hydrocarbon base comprises about 1 to 6 percent of SBR rubber.

8. A paving composition comprising 100 parts of mineral aggregate admixed with 5 to 15 parts of a binder, said binder having a gasoline solubility rating between 0 and 60%, a ductility (ASTM D–113) greater than 45, a Saybolt-Furol viscosity at 275° F. of 100 to 1000 seconds, and consisting essentially of (1) 100 parts of a hydrocarbon base consisting essentially of (a) about 18 to 100 percent of a hydrocarbon resin selected from the group consisting of coumarone-indene resins and petroleum resins derived by polymerization of cracked hydrocarbon streams and having a number average molecular weight between about 250 and 5000, a ring-and-ball softening point in the range between about 0° and 250° C., an iodine number between about 0 and 250, and a Neville color not higher than 10 (b) 0 to 10 percent of a rubbery hydrocarbon polymer, and (c) about 0 to 82 percent of a hydrocarbon plasticizer oil which is substantially free of material boiling below 300° C., and (2) 5 to 10 parts of a solid resinous copolymer of about 99 to 95 mole percent ethylene and about 1 to 5 mole percent ethyl acrylate.

9. A paving composition according to claim 8 wherein said hydrocarbon base comprises about 1 to 6 percent of a rubbery diolefin polymer.

10. A paving composition according to claim 8 further comprising titanium dioxide pigment.

11. A paving composition according to claim 8 further comprising a bright colored pigment in an amount effective to produce a bright colored pavement.

12. A paving composition according to claim 8 further comprising a phthalocyanine green pigment in an amount effective to produce a green pavement.

13. A paving composition according to claim 8 wherein the binder admixed with the mineral aggregate has the following properties:

| | |
|---|---|
| Gasoline solubility rating, percent | 10–50 |
| Ring and ball softening point, ° C. | 60–80 |
| Penetration at 77° F. | 40–100 |
| Ductility (ASTM D–113) | 100+ |
| Saybolt-Furol viscosity at 275° F., secs. | 200–500 |
| Flash point, ° F. | 450 |
| Loss in heating at 325° F. for 5 hours, percent | 0–1 |
| Penetration of residue after loss in heating test, percent of original | 85–100 |

14. A binder composition according to claim 3 wherein said hydrocarbon resin is a resin obtained by Friedel-Crafts polymerization of an unsaturated hydrocarbon fraction boiling between about 100° and 275° C. and resulting from high temperature-low pressure pyrolysis of a hydrocarbon stream containing at least two carbon atoms per molecule.

References Cited by the Examiner

UNITED STATES PATENTS

| | | | |
|---|---|---|---|
| 2,798,866 | 7/1957 | Gordon et al. | 260—82 |
| 2,953,551 | 9/1960 | White | 260—86.7 |
| 3,070,568 | 12/1962 | Gessler et al. | 260—41 |
| 3,070,570 | 12/1962 | Gessler et al. | 260—41 |

FOREIGN PATENTS 900,969  7/1962  Great Britain.

MORRIS LIEBMAN, *Primary Examiner.*

B. A. AMERNICK, *Assistant Examiner.*